Jan. 3, 1939. J. L. HARDY 2,142,725
FLEXIBLE TRANSMISSION COUPLING
Filed Oct. 15, 1937
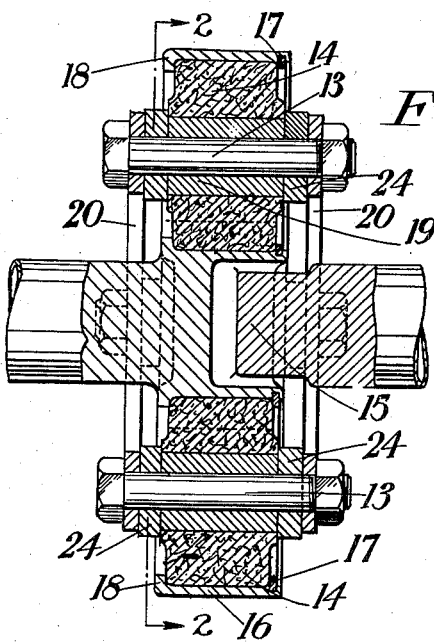
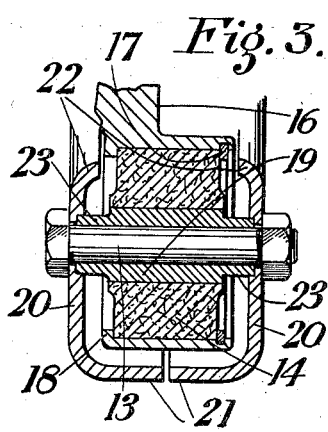
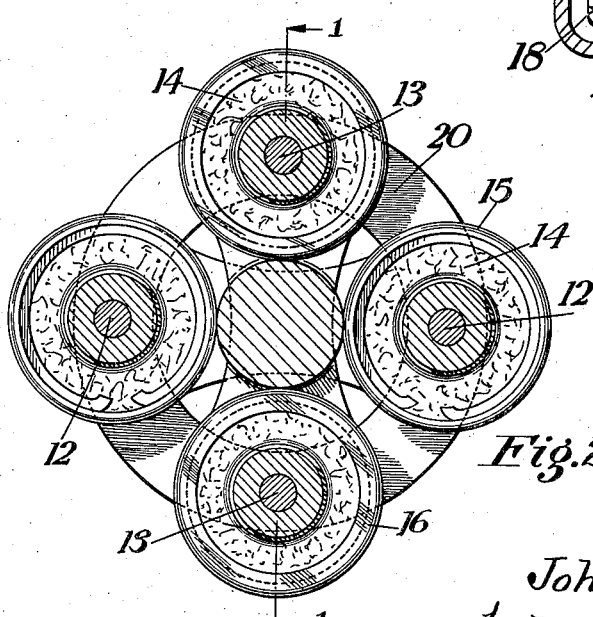
Inventor
John L. Hardy
by Mawhinney & Mawhinney
Attorneys.

Patented Jan. 3, 1939

2,142,725

UNITED STATES PATENT OFFICE 2,142,725

FLEXIBLE TRANSMISSION COUPLING

John Leslie Hardy, Birmingham, England, assignor of one-half to Hardy, Spicer & Co. Limited, Witton, Birmingham, England Application October 15, 1937, Serial No. 169,287
In Great Britain May 1, 1937

4 Claims. (Cl. 64—11)

This invention relates to flexible transmission couplings, particularly for use in the drive of a motor-vehicle, of the kind incorporating driving and driven pins engaged with the bores of rubber bushes or other flexible blocks, the pins being arranged with their axes substantially parallel to one another and not radially of the coupling, and the pins of one set being angularly staggered with respect to those of the other.

In the past the driving and driven pins have been respectively carried by driving and driven forks or other members, and the flexible blocks, engaged by such pins, have been mounted in a coupling member. Such an arrangement, besides being rather expensive to produce, presents difficulties in assembling and dismantling.

According to the present invention, the driving and driven pins are fast with the coupling member and the flexible blocks are respectively carried by the driving and driven members.

A further feature of the invention consists in arranging the coupling member so that the centres of all the flexible blocks are substantially coplanar, so as to avoid overhang of the pins. Preferably the coupling member is a built-up one.

In the accompanying drawing:—

Figure 1 is a section taken on the line 1—1 of Figure 2.

Figure 2 is a vertical section taken on the line 2—2 of Figure 1, and

Figure 3 is a fragmentary section showing a modification.

In the arrangement of Figures 1 and 2, the coupling member is a built-up one comprising two rings 20, 20 arranged one at each end of the driving and driven members and connected together by the pins 12, 13 which pass through the flexible blocks 14 mounted in the cylindrical chambers of the carriers 15, 16. The outer margins of the two rings 20 may be bent towards one another as shown at 21 in Figure 3, so as substantially to enclose the cylindrical chambers, and the inner margins 22 may also be bent inwardly, thus stiffening the rings, which may in this case be formed as pressings. Preferably in this case the flexible blocks have internal metal bushes 19 round the pins and these bushes may extend beyond the ends of the blocks as shown at 23 in Figure 3, and enter recesses in the faces of the two rings of the coupling member so that the drive is not wholly transmitted by the pins. Alternatively, the metal bushes may only extend to the ends of the flexible blocks, as shown in Figure 1, in which case separate washers 24 are preferably interposed between the ends of the bushes and the rings of the coupling member. Such washers are preferably of larger diameter than the bushes, as shown in Figure 1, so that they form abutments at the ends of the flexible blocks and thereby locate these endwise. With such an arrangement the cylindrical chambers of the carriers 15, 16 for the flexible blocks can readily be arranged to be co-planar. Moreover, the torque transmitted is shared between the rings 20—i. e., the shearing force on the pins 12, 13 where they are connected to the coupling member is halved. The carriers 15 and 16 may have inturned ends 18 at one side and expansible rings 17 at the other side as shown in Figure 1 for removably holding the flexible blocks 14 in place in the chambers.

Such flexible couplings can be inexpensively manufactured in practice, and serve for smoothing out torque impulses, on the one hand, and allow for misalignment of the driving and driven members on the other, while they also provide for a limited amount of axial movement.

What I claim as my invention and desire to secure by Letters Patent of the United States is:—

1. A flexible transmission coupling, for use in the drive of a motor-vehicle, comprising driving and driven forks which are angularly staggered with respect to one another, said forks having cylindrical-like chambers the main axes of which are substantially parallel to one another, rubber bushes endwise located in said chambers with their main axes substantially parallel with one another, said chambers arranged so that the centres of said bushes are substantially coplanar, pins endwise located in the bores of said bushes, and a coupling member for said pins, said coupling member including metal rings disposed at the ends of said bushes and secured to said pins.

2. A flexible transmission coupling, for use in the drive of a motor-vehicle, comprising driving and driven forks which are angularly staggered with respect to one another, said forks having cylindrical-like chambers the main axes of which are substantially parallel to one another, rubber bushes endwise located in said chambers with their main axes substantially parallel with one another, pins endwise located in the bores of said bushes, said pins arranged so that their centres are substantially coplanar, and a coupling member for said pins in the form of a pair of metal rings secured to the ends of said pins.

3. A flexible transmission coupling, for use in the drive of a motor-vehicle, comprising driving and driven members having cylindrical-like chambers the main axes of which are substantially parallel to one another and which are angularly staggered with respect to one another, flexible blocks located in said chambers with their main axes substantially parallel with one another, said chambers arranged so that their centres are substantially coplanar, pins endwise located in bores of said blocks, and a pair of rigid rings disposed at the ends of said chambers and secured to said pins.

4. A flexible transmission coupling, for use in the drive of a motor-vehicle, comprising driving and driven forks which are angularly staggered with respect to one another, said forks having cylindrical-like chambers the main axes of which are substantially parallel to one another, rubber bushes endwise located in said chambers with their main axes substantially parallel with one another, said chambers arranged so that their centres are substantially coplanar, pins endwise located in the bores of said bushes, and a pair of metal rings disposed at the ends of said chambers and secured to said pins, said rings shaped so as to substantially enclose said chambers.

JOHN L. HARDY.